(12) United States Patent
Hsieh

(10) Patent No.: US 8,168,876 B2
(45) Date of Patent: May 1, 2012

(54) METHOD OF DISPLAYING MUSIC INFORMATION IN MULTIMEDIA PLAYBACK AND RELATED ELECTRONIC DEVICE

(75) Inventor: Kuo-Chiang Hsieh, Taipei County (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 525 days.

(21) Appl. No.: 12/421,653

(22) Filed: Apr. 10, 2009

(65) Prior Publication Data

US 2010/0262909 A1 Oct. 14, 2010

(51) Int. Cl.
- *A63H 5/00* (2006.01)
- *G04B 13/00* (2006.01)
- *G10H 7/00* (2006.01)

(52) U.S. Cl. ......................................................... 84/609
(58) Field of Classification Search ...................... 84/609
See application file for complete search history.

(56) References Cited

U.S. PATENT DOCUMENTS

| | | | |
|---|---|---|---|
| 5,778,181 A | 7/1998 | Hidary et al. | |
| 7,080,253 B2 * | 7/2006 | Weare | 713/176 |
| 7,081,579 B2 * | 7/2006 | Alcalde et al. | 84/608 |
| 7,308,485 B2 | 12/2007 | Roberts et al. | |
| 7,328,153 B2 * | 2/2008 | Wells et al. | 704/231 |
| 7,386,217 B2 | 6/2008 | Zhang | |
| 7,460,994 B2 * | 12/2008 | Herre et al. | 704/231 |
| 7,723,602 B2 * | 5/2010 | Beckford | 84/609 |
| 2004/0068401 A1 * | 4/2004 | Herre et al. | 704/217 |
| 2004/0107821 A1 * | 6/2004 | Alcalde et al. | 84/608 |
| 2004/0172411 A1 * | 9/2004 | Herre et al. | 707/104.1 |
| 2006/0217828 A1 * | 9/2006 | Hicken | 700/94 |
| 2008/0228744 A1 * | 9/2008 | Desbiens | 707/5 |
| 2009/0144273 A1 * | 6/2009 | Kappos | 707/5 |
| 2009/0228423 A1 * | 9/2009 | Hicken et al. | 706/54 |
| 2010/0145708 A1 * | 6/2010 | Master et al. | 704/270 |
| 2010/0205222 A1 * | 8/2010 | Gajdos et al. | 707/803 |

* cited by examiner

*Primary Examiner* — Jeffrey Donels

(74) *Attorney, Agent, or Firm* — Winston Hsu; Scott Margo

(57) ABSTRACT

Music information is displayed during playback of multimedia content performed by a multimedia playback device. The multimedia content comprises audio and video. To obtain the music information, audio of the multimedia content is retrieved, environmental noise is filtered out of the audio to generate filtered audio, a rhythm of the filtered audio is obtained, and the music information is generated based on the rhythm of the filtered audio. The music information is displayed simultaneously during playback of the multimedia content.

31 Claims, 4 Drawing Sheets

METHOD OF DISPLAYING MUSIC INFORMATION IN MULTIMEDIA PLAYBACK AND RELATED ELECTRONIC DEVICE

BACKGROUND OF THE INVENTION

1. Field of the Invention

The present invention relates to playback of multimedia content, and more particularly, to a method of handling music information relevant to the multimedia content during playback and a related electronic device.

2. Description of the Prior Art

Multimedia, including television, movies, and short clips, are a popular form of entertainment for all demographics. Today, much content is encoded and stored on a variety of different optical media for viewing, such as Digital Versatile Disc (DVD) or Blu-Ray Disc (BD). The multimedia content may also be stored as multimedia files either on local drives, such as a hard disk drive (HDD), or on a server. The multimedia files stored on the server may be downloaded or streamed from the server to a local drive or memory through a network, such as the Internet. To view the multimedia content stored on the DVD or BD, a user will typically need either a DVD player or BD player for reading multimedia data on the DVD or BD and outputting video or image signals thereof to a display, and audio signals thereof to speakers. The multimedia content may include a combination of text, audio, still images, animation, video, and interactivity content. For the playback of the multimedia files, the user will need a playback software application running on hardware, such as a personal computer, for decoding the multimedia file, outputting the video or image signals thereof to the display, and outputting the audio signals thereof to the speakers.

When the user is viewing the multimedia content, the user may want to get information on background music in the multimedia content. The user may take a number of different actions. The user may inquire about information relevant to background music via the Internet. For example, the user needs to know if an original soundtrack has been published for the multimedia content and needs to guess which track of the original soundtrack corresponds to the music playing in the background. Furthermore, the user may ask others what the title of the music is. However, none of the above methods can guarantee that the user will be able to obtain accurate information about the music played in the multimedia content, especially when the user cannot ensure whether the keywords for searching are related to the desired background music.

SUMMARY OF THE INVENTION

According to an embodiment of the present invention, a method of providing music information during playback of multimedia content performed by a multimedia playback device is provided. The multimedia content comprises audio and video. The method comprises retrieving audio of the multimedia content, filtering environmental noise out of the audio to generate filtered audio, obtaining a rhythm of the filtered audio, generating the music information based on the rhythm of the filtered audio, and simultaneously displaying the music information during playback of the multimedia content.

According to the embodiment of the present invention, an electronic device for displaying a mixed video signal in response to a multimedia file comprises an audio processing module, a network module, a processor, and a display controller. The audio processing module comprises an audio extraction module for extracting an audio portion from the multimedia file, a filter for filtering environmental noise out of the audio portion to generate filtered audio, and a rhythm analyzer for extracting a rhythm of the filtered audio. The network module sends the rhythm of the filtered audio to a server to search for information corresponding to the filtered audio. The processor parses the information corresponding to the filtered audio received from the server to generate the music information, and overlays the music information onto a video signal generated from the multimedia file to generate a mixed video signal. The display controller controls a display to simultaneously display the mixed video signal.

According to another embodiment of the present invention, a multimedia playback device for processing music information during playback of multimedia content is provided. The multimedia content comprises audio and video. The multimedia playback device comprises a network module, a processor, and a display controller. The network module is for transmitting a first mark and a second mark of the multimedia content to a database to search information relevant to a melody section of the multimedia content. The melody section is determined according to the first mark and the second mark. The processor is for parsing the information relevant to the melody section received from the database to generate the music information. The display controller is for controlling a display to simultaneously display the video and the generated music information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
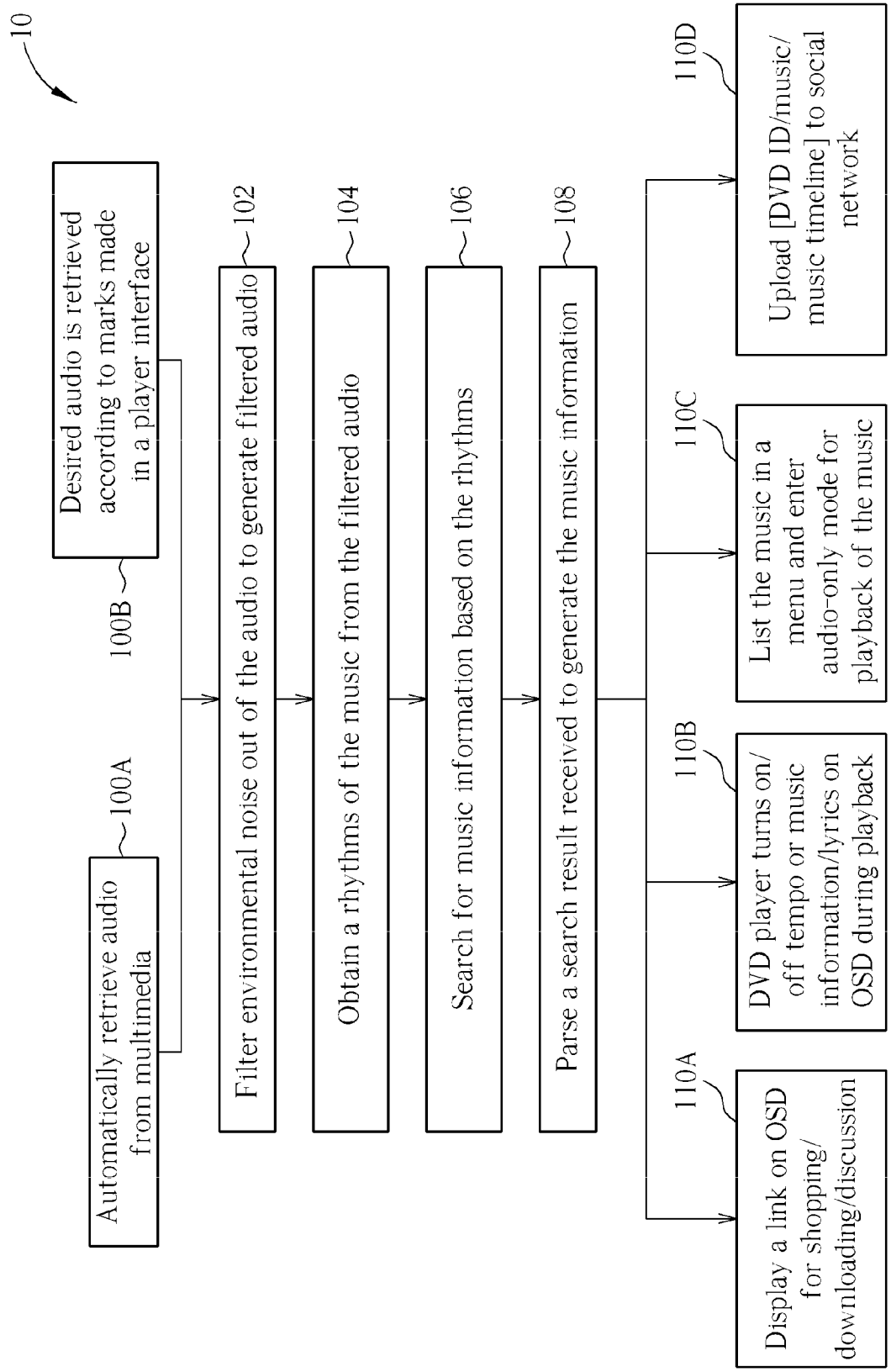
FIG. 1 is a flowchart of a process for handling music information during playback of the multimedia content according to an embodiment of the present invention.

Please refer to FIG. 1, which is a flowchart of a process 10 for displaying music information during playback of the multimedia content according to an embodiment of the present invention. The process 10 is suitable for use in a playback device, such as a DVD player, BD player, or a personal computer with playback software. The respective steps of process 10 may be implemented as software codes executable in an x86 computer platform, firmware codes, the logic modules in an FPGA, ASIC, other kind of hardware, or any combination of the thereof.

Initially, audio of the multimedia content is retrieved (Step 100A/B). The audio may be retrieved automatically during the playback or before the playback (Step 100A), or a user may mark a desired portion of the audio in which music is played via the user-interface of the player, and the desired audio corresponding to the music may be retrieved according to the marks (Step 100B). The music may be retrieved by streaming and/or by downloading. Besides, the audio automatically retrieved in Step 100A would include a plurality of melody sections for further steps. Marking the desired portion may be accomplished by a user inputting a start mark and an end mark corresponding to beginning time and end time of the desired audio. The desired audio may be retrieved by reproducing the desired section of the multimedia content, and recording an audio portion from the desired section.

In a normal situation, the audio may be mixed with the environmental noise, such as speech/dialog, sound effects, and other types of noise. The environmental noise may be filtered from the audio to generate filtered audio (Step 102). The audio portion described above may be used in the filtering step (Step 102). Then, the rhythms of the filtered audio may be obtained by a plurality of acoustic analyzing methods (Step 104). More particularly, the rhythm, such as beats and tempo, are obtained from variations in amplitude and variations in frequency of the filtered audio in the time domain. The beats are represented as the arrangement of strong beats and weak beats in time. The tempo is represented as the speed of the music and is usually indicated in beats per minute (BPM). The rhythms may be represented in text form, binary form, or other digital forms.

The rhythms of the filtered audio may be sent to a database to search for music information (Step 106). The "database" may refer to an online information service or a plurality of tables which may be interlinked and are searchable through a query language, such as SQL. The database may be stored in a local system or on a remote server accessed via networking. In one embodiment, the rhythms of the filtered audio are compared with a plurality of records in the database. The primary information will be obtained if there are matched records in the database. For example, the title of the music recorded in the database is obtained while the tempo and the beats of the music are matched with those of the filtered audio. Thus, at least one record in the database relevant to the rhythm of the filtered audio may be identified, and a plurality of information may be searched using the identified record. The tempo information of the filtered audio may be compared with tempo information of the records in the database, and the beat information of the filtered audio may be compared with beat information of the records in the database. The searching for the information relevant to the filtered audio may be performed iteratively according to the previous result. In the current embodiment, the title of the song is obtained from the database, and more music information may be obtained by searching for any information relevant to the title of music and the previously obtained information. The music information includes, for example but not limited to, name of an artist, title of an album, song title, genre, year of publishing, year of production, and online purchase information corresponding to the rhythms. In one embodiment, the process 10 may further comprise searching for a plurality of music movements according to a plurality of keywords. The keywords may include an artist, an album, a song title, a genre, and/or a year of production. Then, a list of the searched music movements may be generated. The list of similar music movements may be displayed in the OSD, and the desired music may then be played when the user clicks on one or more of the music movements. The similar music movements may be searched for according to title, the rhythm, genre, and/or other music information. For example, the multimedia content may only use a section from one specific movement of an opera. However, all music from each movement of the opera may be provided in the list of similar music movements.

The search results may then be received and parsed (Step 108) to generate the music information. The search results include various types of information, such as an audio file, a web page, or a blog including the desired keywords and other non-necessary information. Some information is parsed from the search results using some predetermined criteria. For example, the information about artist, album, published date, a link to another web site, and genre are parsed according to pre-determined logics. Furthermore, the parsed information could be stored in a storage device, such as a memory, a hard disk drive or other storage device. In another embodiment, the method will provide the capability to access the links to the website parsed from the music information, and analyze the content of the websites. Through further analysis, the popular words in the content of the website can be identified, and the type of the link, such as a website of a music download provider, a lyrics service website, a music forum, or a website for fans, are determined based on the content of the website. The newly obtained information could be added into the record of the music information previously stored in the storage device. All of the information may not be obtained in one search result. The search will be performed repeatedly if the music information is not obtained. Any combination of the obtained title, album, artist and other information in the current search result would be used as keywords for the next search. The combination of the obtained information could improve the efficiency and the accuracy of the next search result. In addition, the keywords for the next search are parsed from the obtained information according to weightings of the types of the information. For example, the weighting of the album is higher than that of the artist in order to search for the information relevant to the music of the album. In addition, the weighting of each type of information is determined or changed by users.

At this point, the playback device or personal computer has obtained the music information corresponding to the filtered audio being played or the audio portion marked by the user, and the music information may be displayed simultaneously during playback of the multimedia content (Steps 110A/110B/110C/110D).

Figure 2:
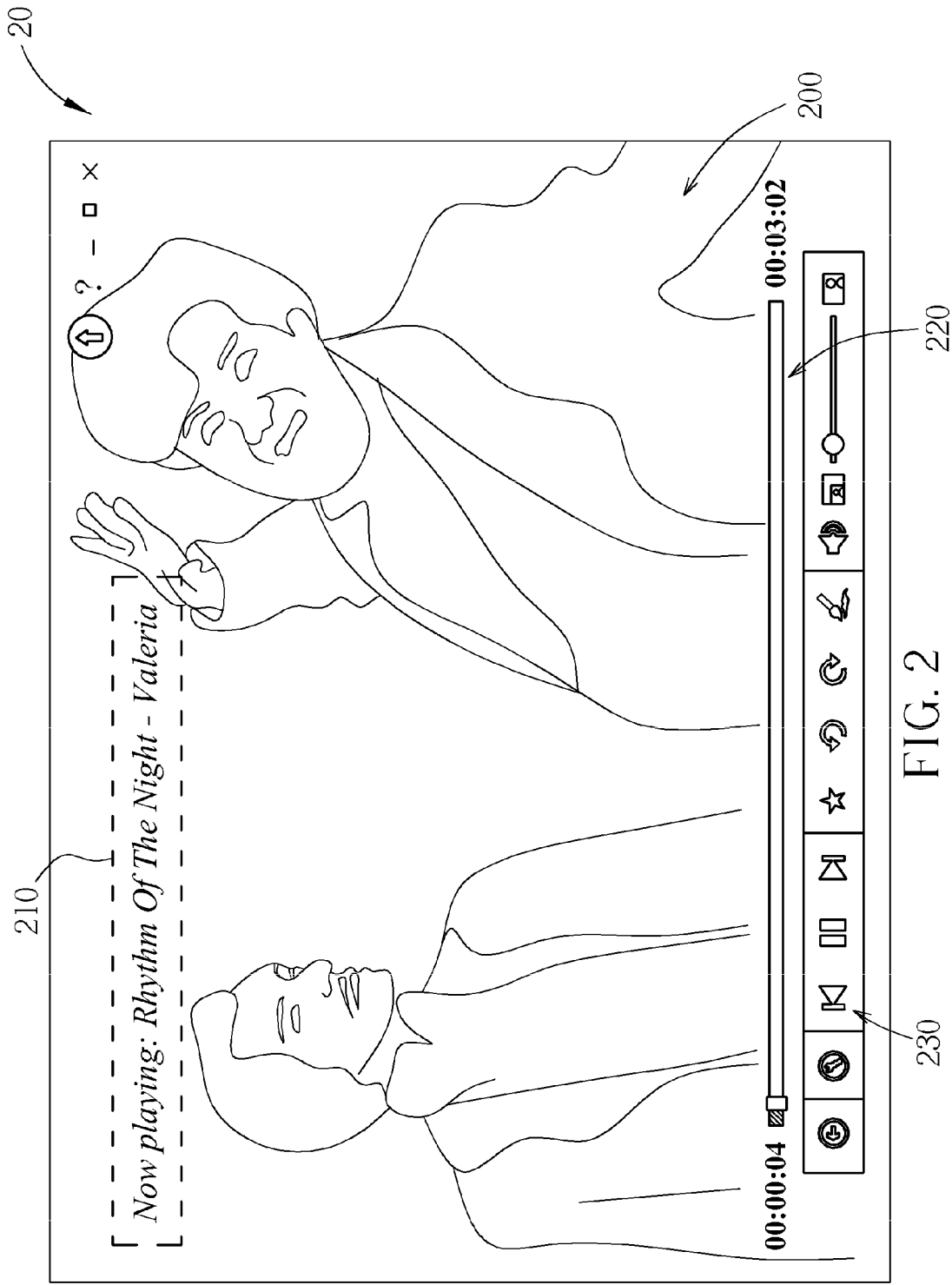
FIG. 2 is a diagram of a video player interface handling music information during multimedia content playback according to the embodiment.

Please refer to FIG. 2, which is a diagram of a multimedia player interface 20 handling the music information according to the embodiment. The multimedia player interface 20 includes a video frame 200, a music information frame 210, a time progress bar 220, and a control bar 230. The multimedia player interface 20 may be an image superimposed on a screen picture, also known as an on-screen display (OSD). Once the music information, such as the artist and song title, is obtained, the playback device or personal computer may use the music information in performing a number of operations. For example, a link to the music at an online store, a link to a download site for downloading the music, or a link to a music forum for the music may be generated according to the music information, and the link may be simultaneously displayed on the OSD during playback of the multimedia content (Step 110A). The link is generated from the parsed result. For example, the various links of different websites would be found by using the keywords, such as the artist, the album, the titles of the songs, genre of the album, the published date, and other keywords. According to analyzing the content of the linked website, the type of the linked website would be determined. For example, a link to a download site would be determined if the content of the website included the phrase "downloading". Then, the website, e.g. the online store, the download site, or the music forum, may be browsed in the OSD when the link is clicked. In one embodiment, a link parsed from the searched result would direct to a web page to introduce the music, such as a web page for one album, or a web page for an artist. The web page may provide another link to the download site for the specific music. Thus, the link for the download site could be obtained by analyzing the content which is linked from the search result. The link may be for downloading a song relevant to the music information from a website. Then, the song may be downloaded from the website, and a list of downloaded songs may be displayed.

The music information, including the tempo of the music, and/or lyrics of the music may be simultaneously displayed on the OSD during playback of the multimedia content (Step 110B). A title of a song corresponding to the filtered audio may be displayed. The title of the song may be obtained when a rhythm of the song matches the rhythm of the filtered audio. For example, the song title and artist may be displayed in the music information frame 210. Of course, the music information frame 210 may be utilized for simultaneously displaying any of the links described above for Step 110A or the music information described for Step 110B.

A menu listing the music may also be generated according to the music information, and the playback device or personal computer may enter an audio-only mode, in which the music may be played back without displaying the multimedia content (Step 110C). The menu would list all melody sections of the original multimedia content, and the downloaded music in response to the melody sections. Thus, the unfiltered melody section of the original multimedia content, the filtered melody section of the original multimedia content, or a downloaded music would be played back as the user's choice.

Besides, the music information, DVD/BD information, and a music timeline may be uploaded to a social network for sharing the information with other users (Step 110D). For example, a user may upload a DVD identifier, a mark in time and a mark out time of the multimedia content, and the song title and the artist to the social network.

In the above, a number of methods may be employed for obtaining the music information. For example, the desired audio portion is obtained by recording the audio data during the reproduction of the multimedia content, then the desired audio portion is sent to a music analysis website to obtain title, album, and artist information for the music currently being played. The search results, such as the information and a disc ID, along with playback timeline information, may be stored at a website to make it convenient for future viewers to obtain the same information. Furthermore, a user's comment on the music would be also stored in response to the information in the website.

Regarding display of the music information, the music information may be displayed over the video frame 200, and the user may configure display settings, such as display position, size, and font. A link to a website which sells an original soundtrack (OST) containing the music may also be displayed for the user to browse to a page to buy the OST. The player software or playback device may also access a lyrics database to download lyrics for the music, and may display the lyrics. The lyrics database also is a lyrics website or other video database. The lyrics may be extracted from a video subtitle. The lyrics may be parsed in advance according to the audio of the multimedia content, and be simultaneously displayed in the OSD during playback of the multimedia content. If the multimedia content does not contain subtitles, a subtitle region may be utilized for displaying the lyrics. A link to a webpage containing the lyrics may also be displayed. Any link displayed in the OSD may be selected, e.g. clicked, by the user, and the corresponding webpage may be browsed in the OSD.

Figure 3:
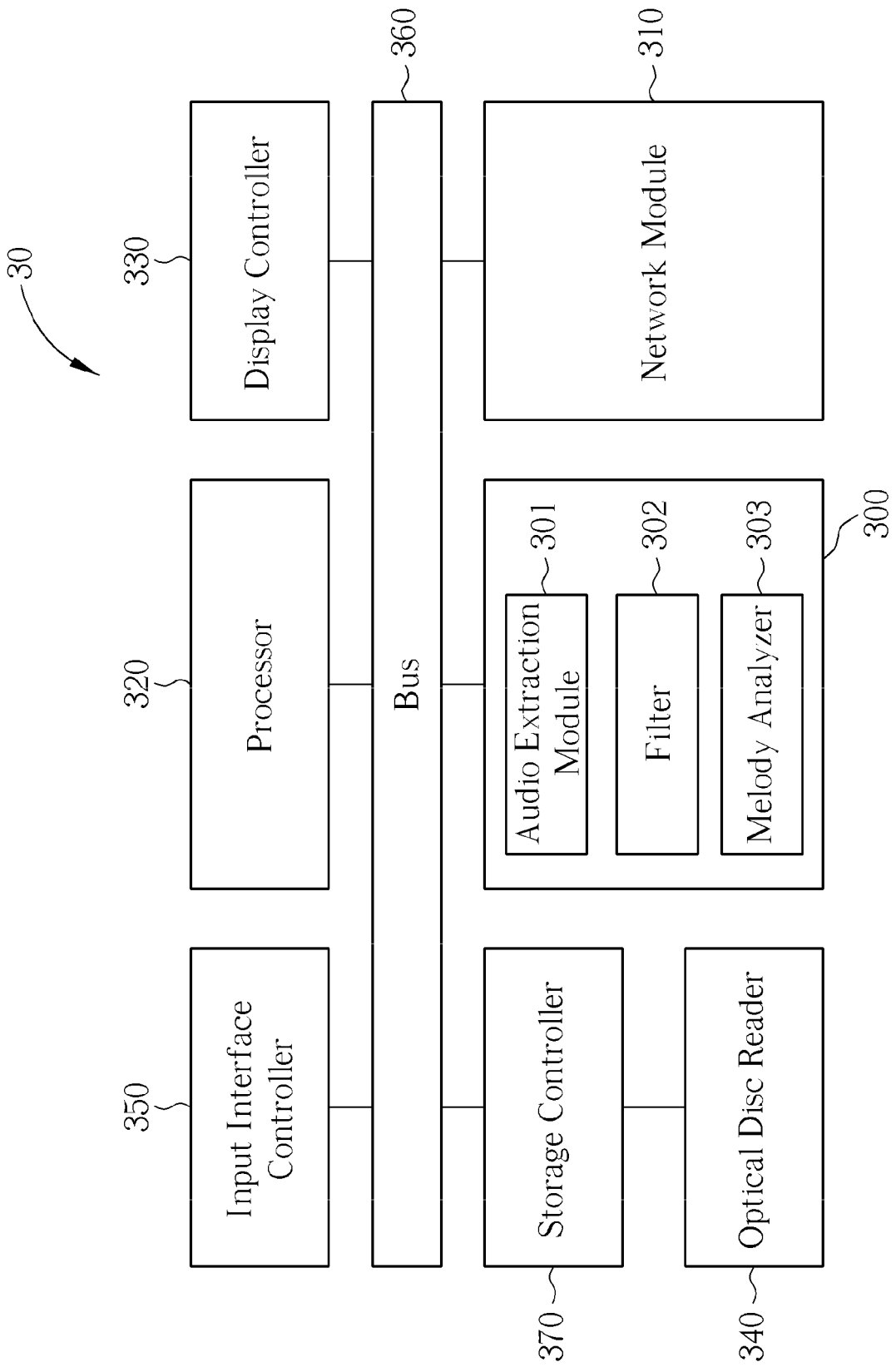
FIG. 3 is a block diagram of an electronic device for handling the music information according to the embodiment.

Please refer to FIG. 3, which is a block diagram of an electronic device 30, such as the playback device or personal computer described above, for handling the music information according to the embodiment. The electronic device 30 comprises an audio processing module 300, a network module 310, a processor 320, and a display controller 330, which may communicate with each other through a bus 360. The bus 360 may be a peripheral component interface (PCI) bus, a PCI-Express (PCI-E) bus, or any other bus interface. The audio processing module 300 comprises an audio extraction module 301 for extracting an audio portion from a multimedia file, a filter 302 for filtering environmental noise out of the audio portion to generate filtered audio, and a rhythm analyzer 303 for extracting a rhythm of the filtered audio. The network module 310 sends the rhythm of the filtered audio to a server to search for music information corresponding to the filtered audio. A logic module embedded in the processor 320 parses a search result received from the server to generate the music information by executing the software codes, and overlays the music information onto a video signal generated from the multimedia file to generate a mixed video signal. The display controller 330 controls a display to display the mixed video signal. The electronic device 10 may also comprise an optical disc reader 340 connected to the bus 360 through a storage controller 370 for reading the multimedia file. The multimedia file may be stored on an optical medium, such as a DVD, read by the optical disc reader 340. However, the multimedia file may also be received by the network module 310, or may be stored locally in non-volatile memory, such as on a hard disk drive, solid state disk, memory array, flash memory drive, or other storage device. The storage controller 370 may be utilized to interface with the optical disc reader 340. In another embodiment, the storage controller 370 may be utilized to as the interface between the electronic device 30 and other types of storage device, for example but not limited to a hard disk drive, a solid state disk, or a magnetic disc. The electronic device may also comprise an input interface controller 350 for receiving a first mark and a second mark corresponding to the music timeline mentioned above. For example, the first mark may be a beginning of the desired audio portion, and the second mark may be an end of the desired audio portion. In this case, the audio extraction module 301 extracts the audio portion from the multimedia file according to the first mark and the second mark. Both the optical disc reader 340 and the input interface controller 350 may also be coupled to the bus 360. In another embodiment of the current invention, the marks would be obtained by analyzing the tempo of the audio. The music, human vocal sounds, and the background noise have different tempo and are easily identified in the frequency domain. Thus, the rhythm analyzer 303 may automatically analyze the tempo of the audio and determine the section of the audio for further processing according to the tempo of the audio.

Figure 4:
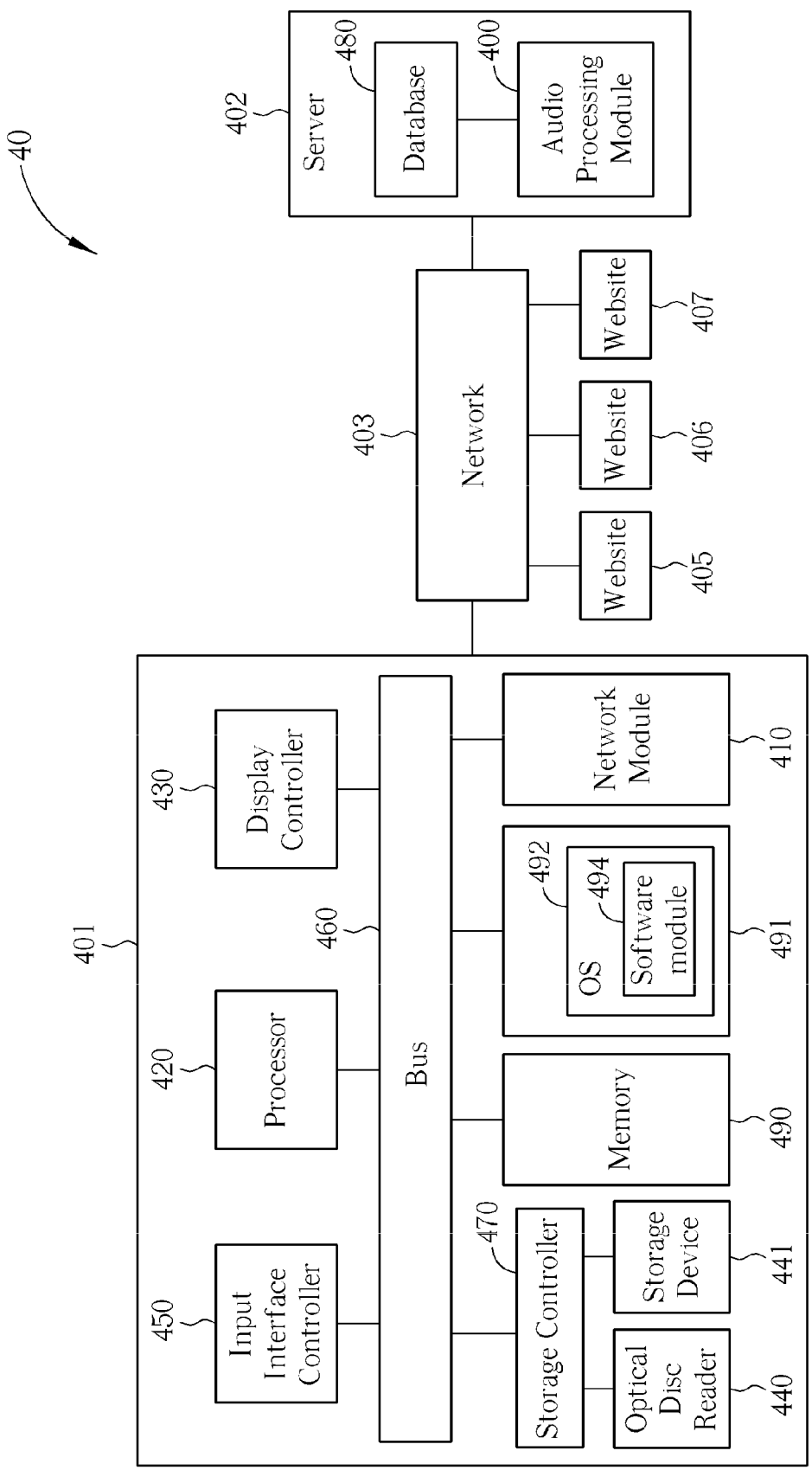
FIG. 4 is a diagram of a multimedia playback system according to the second embodiment.

Please refer to FIG. 4, which is a diagram of one embodiment of a multimedia playback system 40 according to the second embodiment of current invention. The multimedia playback system 40 may comprise an electronic device 401, and may further comprise a server 402 comprising a database 480. The electronic device 401 may access the database 480 and other websites 405, 406 and 407 through a network 403. For example, the network module 410 may access the database 480 through the network 403. The network 403 may be a wired networking system, a wireless networking system, a telecommunications system, or other network capable of allowing data transfer between the electronic device 401 and the server 402. In the electronic device 401, or multimedia playback device, the input interface controller 450 receives a first mark and a second mark corresponding to a timeline representing the proceeding of the playback of the multimedia content. The first mark and the second mark are used to define a section of the audio. The network module 410 transmits a unique identifier of the multimedia content, the first mark and the second mark to the database 480 to search for music information corresponding to the section of the audio. The server 402 searches and retrieves the section of the audio according to the unique identifier of the multimedia content, the first mark and the second mark from the database 480. Furthermore, the server 402 filters the section of the audio to reduce the environmental noise and obtain the filtered section. After querying the database 480 using the filtered section, the server 402 parses the search result received from the database 480 to generate the music information. The music information is transmitted to the electronic device 401. The electronic device 401 will parse the music information from the server 402. In the current embodiment, the parsing method is implemented as a software module 494 stored in a module 490 and executed by the processor 420 through the connection of the bus 460. Furthermore, the software module 494 will be cooperated with an operating system 492 for the data transferring/signal control with the processor 420 and other device. The operating system 492 and the software module 494 may be stored in a storage module 491 connected to the bus 460. The storage module 491 may be a hard disk, non-volatile memory, or an optical disk, and is not limited herein. The electronic device 401 may store the music information and/or the parsed information in a storage device 441. It should be noted that the operating system 492 shown in FIG. 4 is for illustrative purposes only, and is not meant to be a limitation to the scope of the present invention. The operating system 492 is also a software for parsing a melody.

In the current embodiment, the storage device is an electronic storage device, a magnetic storage device, or an electromagnetic storage device coupled to the storage controller 470. In another embodiment, the music information would be stored in a memory inside of the electronic device 401, such as a cache module inside of the processor 420, or a memory 490 coupled with the bus 460. Furthermore, the music information may be uploaded to a website via the network 403, such as a music forum. The display controller 430 controls a display to simultaneously display the video and the generated music information. In this embodiment, an input interface controller 450 of the electronic device 401 could receive the commands from a remote controller, a mouse, a keyboard, a touch panel or other kind of input device. While the electronic device 401 receives the multimedia content from the optical disc reader 440, a notice for analyzing the music of the multimedia content may be shown on the display. The input interface controller 450 may receive a control signal in response to the analyzing selection from users. The electronic device 401 will perform the previous steps until the end of the whole multimedia content. Thus, the music information would be simultaneously displayed during the playback of the multimedia content.

In another embodiment, the optical disc reader 440 retrieves a portion of the multimedia content stored on a BD. Via the data transmitting inside of the electronic device 401, (e.g. via the storage controller 470, the bus 460 and the control mechanism), the portion of the multimedia content could be retrieved by the network module 410. For obtaining the music information, the network module 410 may transmit the portion of the multimedia content to the server 402. The audio portion is extracted from the portion of the multimedia content, and the audio portion is filtered by an audio processing module 400 in the server 402. The audio processing module 400 further provides the rhythm of the audio portion to the database 480 to search for the music information relevant to the audio portion. The searched result will be sent to the electronic device 401 to generate the music information.

The embodiments of the present invention provide viewers with information related to music played in multimedia content by analyzing the audio, extracting rhythm of an audio section, and retrieving music information from the Internet. The music information may be displayed directly in the OSD, or may be utilized to search for the related information. Thus, the embodiments of the present invention provide a richer experience for viewers of multimedia content with background music, allowing the viewer to purchase, download, discuss, or find lyrics for the music in an efficient and intuitive manner.

Those skilled in the art will readily observe that numerous modifications and alterations of the device and method may be made while retaining the teachings of the invention.

What is claimed is:

1. A method of providing music information during playback of multimedia content performed by a multimedia playback device, the multimedia content comprising audio and video, the method comprising:
   marking a desired section of the multimedia content;
   retrieving desired audio corresponding to the desired section of the multimedia content;
   filtering environmental noise out of the desired audio to generate filtered audio;
   obtaining a rhythm of the filtered audio;
   generating the music information based on the rhythm of the filtered audio; and
   simultaneously displaying the music information during playback of the multimedia content.

2. The method of claim 1, wherein the step of generating the music information comprises:
   identifying at least one record in a database relevant to the rhythm of the filtered audio; and
   searching a plurality of information using the identified record; wherein the music information is generated by parsing the searched information.

3. The method of claim 2, wherein the step of identifying the record in the database relevant to the rhythm of the filtered audio comprises:
   comparing a tempo information of record with a tempo of the filtered audio; and
   comparing a beat information of record with a beat of the filtered audio.

4. The method of claim 1, wherein the step of retrieving audio of the multimedia content comprises
   reproducing the desired section of the multimedia content; and
   recording an audio portion from the desired section of the multimedia content, wherein the audio portion is used in the filtering step.

5. The method of claim 1, further comprising:
   uploading the music information to a social network website.

6. The method of claim 5, further comprising:
   uploading a user's comment on the multimedia content to a website in response to the music information.

7. The method of claim 1, wherein displaying the music information during playback of the multimedia content is displaying on an on-screen display.

8. The method of claim 1, further comprising:
   generating a link to a website selling an original soundtrack comprising the multimedia content according to the music information.

9. The method of claim 8, further comprising:
   the multimedia playback device browsing to the website when the link is clicked.

10. The method of claim 1, further comprising:
generating a link to a website for downloading a song relevant to the music information.

11. The method of claim 10, further comprising:
the multimedia playback device downloading the song from the website after the link is clicked.

12. The method of claim 11, further comprising:
displaying a list of downloaded songs.

13. The method of claim 1, further comprising:
generating a link to a website of a music forum according to the music information.

14. The method of claim 13, further comprising:
the multimedia playback device browsing to the website when the link is clicked.

15. The method of claim 1, wherein the step of displaying the music information comprises displaying a title of a song corresponding to the filtered audio.

16. The method of claim 15, further comprising:
entering an audio-only mode for playback of the music.

17. The method of claim 16, wherein the music is retrieved by streaming.

18. The method of claim 16, wherein the music is retrieved by downloading.

19. The method of claim 1, further comprising:
accessing a lyrics database for receiving lyrics corresponding to the music information.

20. The method of claim 19, further comprising:
displaying a link to the lyrics database corresponding to the music information.

21. The method of claim 19, further comprising:
parsing the lyrics according to the filtered audio of the multimedia; and
displaying the parsed lyrics during playback of the multimedia content.

22. The method of claim 1, wherein the step of generating the music information comprises:
obtaining a title of a song, wherein a rhythm of the song matches with the rhythm of the filtered audio; and
searching for music information according to the obtained title.

23. The method of claim 1, wherein the music information comprises:
an artist, an album, a song title, a genre, a year of production, and a link to a website.

24. An electronic device for displaying a mixed video signal in response to a multimedia file, the electronic device comprising:
an input interface controller for receiving a first mark and a second mark of the multimedia file;
an audio processing module comprising:
an audio extraction module for extracting an audio portion from the multimedia file according to the first mark and the second mark;
a filter for filtering environmental noise out of the audio portion to generate filtered audio; and
a rhythm analyzer for extracting a rhythm of the filtered audio;
a network module for sending the rhythm of the filtered audio to a server to search for information corresponding to the filtered audio;
a processor for parsing the information corresponding to the filtered audio received from the server to generate the music information, and overlaying the music information onto a video signal generated from the multimedia file to generate a mixed video signal; and
a display controller for controlling a display to simultaneously display the mixed video signal.

25. The electronic device of claim 24, further comprising:
an optical disc reader for reading the multimedia file from an optical medium.

26. The electronic device of claim 24, further comprising:
an input interface controller for receiving an input signal;
wherein the input signal triggers the electronic device to display the mixed video signal in response to the multimedia file.

27. A multimedia playback device for providing music information during the playback of multimedia content, the multimedia content comprising audio and video, the multimedia content playback device comprising:
a network module for transmitting a first mark and a second mark of the multimedia content to a database to search information corresponding to a melody section of the multimedia content, wherein the melody section is determined according to the first mark and the second mark;
a processor for parsing the information relevant to the melody section received from the database to generate the music information; and
a display controller for controlling a display to simultaneously display the video and the generated music information.

28. The multimedia playback device of claim 27 further comprising:
an input interface controller for receiving the first mark and the second mark.

29. The multimedia playback device of claim 27 further comprising:
a tempo analyzing module to determining the first mark and the second mark according to tempo of the audio.

30. The multimedia playback device of claim 27, wherein the network module further transmits a unique identifier of the multimedia content to the database to search for music information corresponding to the melody section.

31. The multimedia playback device of claim 27, wherein the database is coupled with an audio processing module, and the audio processing module is for extracting an audio portion from the multimedia content according to the first mark and the second mark, filtering environmental noise out of the audio portion to generate filtered audio and extracting the melody section from the filtered audio.

* * * * *